(12) United States Patent
Salazar et al.

(10) Patent No.: US 11,596,965 B2
(45) Date of Patent: Mar. 7, 2023

(54) SPRAY BOOTH WITH CAROUSEL DRY FILTER MODULE

(71) Applicant: GIFFIN, INC., Auburn Hills, MI (US)

(72) Inventors: Abraham J. Salazar, Lake Orion, MI (US); Donald A. Cook, Shelby Township, MI (US); James G. Vanderworp, Milford, MI (US)

(73) Assignee: Giffin, Inc., Auburn Hills, MI (US)

( * ) Notice: Subject to any disclaimer, the term of this patent is extended or adjusted under 35 U.S.C. 154(b) by 283 days.

(21) Appl. No.: 16/772,778

(22) PCT Filed: Dec. 14, 2018

(86) PCT No.: PCT/US2018/065603
§ 371 (c)(1),
(2) Date: Jun. 13, 2020

(87) PCT Pub. No.: WO2019/118804
PCT Pub. Date: Jun. 20, 2019

(65) Prior Publication Data
US 2020/0331018 A1 Oct. 22, 2020

Related U.S. Application Data

(60) Provisional application No. 62/598,723, filed on Dec. 14, 2017.

(51) Int. Cl.
*B05B 14/43* (2018.01)
*B05B 16/40* (2018.01)
(Continued)

(52) U.S. Cl.
CPC .............. *B05B 14/43* (2018.02); *B01D 46/58* (2022.01); *B01D 46/88* (2022.01); *B01D 46/90* (2022.01); *B05B 16/40* (2018.02)

(58) Field of Classification Search
CPC ......... B05C 15/00; B05B 14/40; B05B 14/43; B05B 16/00; B05B 16/40; B05B 16/60;
(Continued)

(56) References Cited

U.S. PATENT DOCUMENTS 4,260,400 A   4/1981  Scalet
4,589,892 A * 5/1986  Leonard ................ F24F 3/1423
                                                                  96/115
(Continued)

FOREIGN PATENT DOCUMENTS

DE   10 2016 001 486 A1   8/2016
EP       3 259 044 B1     9/2020
(Continued)

OTHER PUBLICATIONS

International Search Report and Written Opinion of PCT/2018/065603, dated Feb. 28, 2019.

*Primary Examiner* — Laura Edwards
(74) *Attorney, Agent, or Firm* — Dickinson Wright PLLC (57) ABSTRACT

A spray booth especially adapted for painting operations having a dry filter module with features for allowing changing of the filters quickly and in a contained environment, which reduces exposure to non-authorized and non-properly-protected personnel. A carousel-like filter module flips a wall to move dirty filters into a containment space while placing clean filters in position to continue the painting process. The process and device in accordance with this invention is safe, repeatable, predictable, and capable of changing a large number of filters in a short period of time, for example, during lunch break or other short break in the painting operation.

13 Claims, 13 Drawing Sheets

(51) Int. Cl.
  *B01D 46/58* (2022.01)
  *B01D 46/88* (2022.01)
  *B01D 46/90* (2022.01)
(58) Field of Classification Search
  CPC ........ B01D 46/58; B01D 46/88; B01D 46/90;
         F16L 45/00; Y10S 55/46; Y10S 118/07
  USPC ........................................................ 118/326
  See application file for complete search history.

(56) References Cited

U.S. PATENT DOCUMENTS

| | | |
|---|---|---|
| 5,720,811 A | 2/1998 | Eder |
| 2004/0187774 A1 | 9/2004 | Guiduzzi et al. |

FOREIGN PATENT DOCUMENTS

| | | | |
|---|---|---|---|
| JP | 49-51756 | * | 5/1974 |
| WO | 2016/131436 A2 | | 8/2016 |
| WO | 2017/093874 A1 | | 6/2017 |

* cited by examiner

SPRAY BOOTH WITH CAROUSEL DRY FILTER MODULE

CROSS-REFERENCE TO RELATED APPLICATION

This application is a 35 U.S.C. § 371 national phase of PCT International Application No. PCT/US2018/65603, filed Dec. 14, 2018, which claims the benefit of priority under 35 U.S.C. § 119 to United States Provisional Application No. 62/598,723, filed Dec. 14, 2017, the contents of which are incorporated herein by reference in their entirety.

BACKGROUND

This invention relates to a paint spray booth with a carousel-like dry filter module (or modules).

SUMMARY

Spray booths are used in many industrial applications for applying paint or other coatings to components or assemblies. These systems are used to create an environment for applying high-quality coatings as well as controlling the environmental emissions of solids and volatile organic compounds (VOCs). In some applications, typically those for applying paint to components using a booth which may not be as large as an automobile body paint booth or where there is a low-volume production requirement, it is appropriate and convenient to use dry filters as an alternative to water wash systems to capture the oversprayed paint. For example, even within the automotive vehicle production market, spray booths used to paint smaller parts, fascias, mirror covers, etc. are potential candidates to use a dry type filter system. In addition, dry filter systems may be used for proving out production painting processes, for repair of defects in previously painted articles, or for "training" robot paint application systems. In any case, the choice the system type depends on the amount of overspray generated per unit time, and other factors.

In addition to simplicity and reduced initial investment, dry filter booths have the advantage over water wash systems in that they do not add moisture to the exhaust air, therefore, in principle, reconditioning the air to allow recirculating it back to the booth should be operationally cheaper. However, since dry filters typically do not remove VOCs flashing from the paint into the air, the concentration of fumes in the exhaust can be typically larger than that in water washed booths. An explanation for this is that both the water and the chemicals added to it absorb some of these VOCs. In addition, a water washed filter is constantly transferring paint into water. This water stays only a short period of time in contact with the air. In fact, the majority of the water is collected and removed from the booth shortly after contacting the paint and directed to a treatment process. In the dry filter booth, the captured paint remains in the filter which continues being exposed to the air and evaporating VOCs, until it almost dries up. Therefore, the total amount of VOCs released to the air per unit mass of paint sprayed is typically larger in a dry filter booth.

Moreover, since dry filter booths are typically less complex, their spraying process do not usually include robots and electrostatic charging. As a result, paint transfer efficiency is typically lower in dry filter booths when compared to that occurring in a more sophisticated water washed booth. Lower transfer efficiency means more overspray generated per unit mass of paint sprayed. More overspray in turn means more paint to capture and more VOCs released to the air. All these reasons limit the use of dry filter booths in certain painting operations, for example they are not suitable for operations that use a substantial amount of paint per unit time.

Another limitation, and inconvenience, of presently available dry filter spray booths is that, as the filters load with paint, the pressure drop through the filters constantly changes, which affects not only the energy required to operate the booth but also the air distribution in the spraying section, potentially affecting the quality of the paint job. Moreover, for a given filter type, design and configuration, a correlation exists between the filter's efficiency and how quickly it will load with paint. When the filters load excessively, it is typically mandatory to stop the painting operation to change the filters. This may be a time consuming process that adds no value to the production process, thus, it becomes a waste in productivity.

Although it still inherits most advantages and limitations of other dry filter booths applications, the present concept allows changing the filters quickly and in a contained environment, which reduces exposure to non-authorized and non-properly-protected personnel. A carousel-like filter module flips a wall to move the dirty filters into a containment space while placing clean filters in position to continue the painting process. The process and device in accordance with this invention is safe, repeatable, predictable, and capable of changing a large number of filters in a short period of time (for example, during lunch break or other short break in the painting operation).

BRIEF DESCRIPTION OF THE DRAWINGS

FIG. 4(*a*) is a top view of a spray booth utilizing the dry filter module shown in FIG. 1, and FIG. 4(*b*) is a front view of the assembly shown in FIG. 4(*a*).

FIG. 5(*a*) is a top view of a spray booth utilizing the dry filter module shown in FIG. 1 with a modified system for handling exhaust air as compared with the design shown in FIGS. 4(*a*) and 4(*b*), and FIG. 5(*b*) is a front view of the assembly shown in FIG. 5(*a*).

DETAILED DESCRIPTION OF THE PRESENTLY PREFERRED EMBODIMENTS

Figure 1:
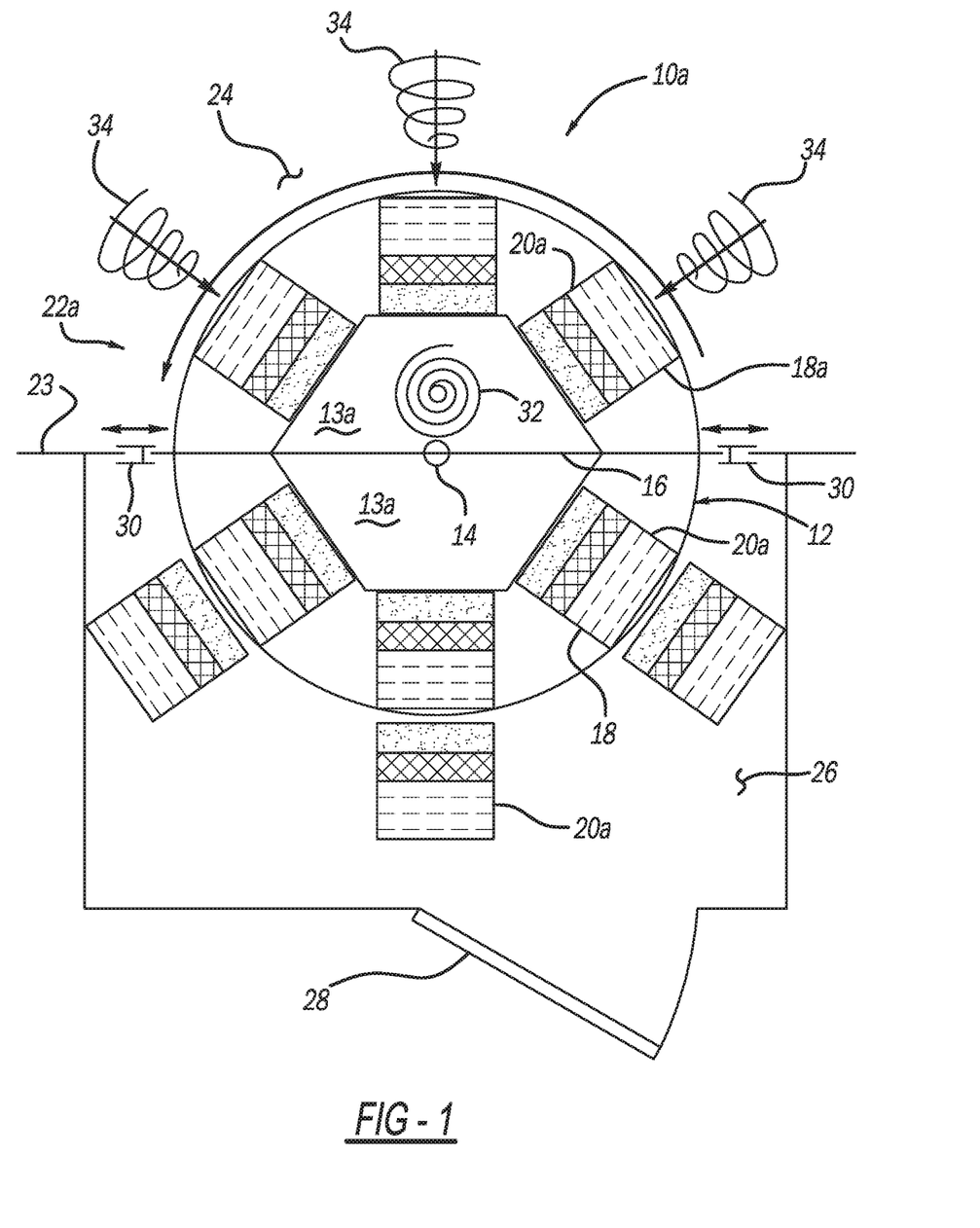
FIG. 1 is a top schematic view of a first embodiment of the present invention.

With reference to FIG. 1 a first embodiment of a dry filter module 10*a* is described. Filter module 10*a* incorporates a rotary carousel 12 which rotates about vertical axis 14. A central diametric dividing wall 16 is provided within carousel 12. Mounting units 18 are provided for supporting dry filters 20a. In this embodiment, six mounting units 18 are provided for mounting three filters 20a on one side of dividing wall 16, and in a symmetrical manner, three additional filters 20a are provided on the opposite side of the dividing wall. As described here, filters can be in the form of individual units or composite units and may be stacked vertically based on the height of carousel 12. At least a part of the spray booth wall or partition 23 is aligned with dividing wall 16. One half of carousel 12 is positioned on the inside of spray booth interior 24 with the other symmetric opposite half is positioned within containment chamber 26. Containment chamber 26 includes access door 28. Clamp seals 30 are provided to create a sealed environment when they bridge from spray booth wall 36 and engage with carousel dividing wall 16. Clamp seals 30 may be actuated to open and permit rotation of carousel 12, as will be described in the following discussion. Carousel 12 forms cavities 13a between the back side of the two arrays of dry filters 20a on both sides of dividing wall 16 and the dividing wall to create a flow path for exhaust airflow 32 through an exhaust opening that connects to an exhaust tap duct 41 and an exhaust plenum 42, both shown in FIGS. 4b and 5b. In operation, for the filters 20a positioned within spray booth interior 24, air is drawn into and through the filters and exits via the exhaust airflow 32. Access door 28 allows a worker to enter containment chamber 26 for filter changing as will be described, while providing a sealed environment.

As shown in FIG. 1, in a mode of operation, contaminated airflow 34 passes through the filters 20a exposed to spray booth interior 24. This occurs until it is necessary to change out the filters 20a as they reach their capacity for containing captured materials. When this occurs, clamp seals 30 are actuated to retract and carousel 12 is rotated 180° to present a new group of (in this embodiment) three filters 20a into spray booth interior 24 and clamp seals 30 are again actuated to create a sealed environment so that the spray booth 22a may be operated again with minimal downtime. At this time personnel may enter containment chamber 26 through access door 28 to change out dirty filters 20a with new or regenerated filters for the next cycle of operation.

The containment chamber 26 serves triple purposes. First, it protects unauthorized personnel from exposure to the paint laden filters 20a. Second, it provides an area where the dirty filters may be switched by clean ones while the spray booth 22a is back in operation. And, third, as long as the access door 28 of the containment chamber 26 is kept closed, it reduces the need for a fully air tight seal around the carrousel 12 (that is, the retractable clamp seals 30 and the top and bottom surfaces of the carousel do not need to be 100% air tight). Since the under section 40 of the spray booth 22a operates under negative gauge pressure, any air leak should be into the under section. However, without a properly sealed containment chamber 26 (for example, without the access door 28 closed), the air leak could affect the amount of air drawn through the capturing filters, which in turn could affect the airflow rate as well as its pattern in the spraying section.

Figure 2:
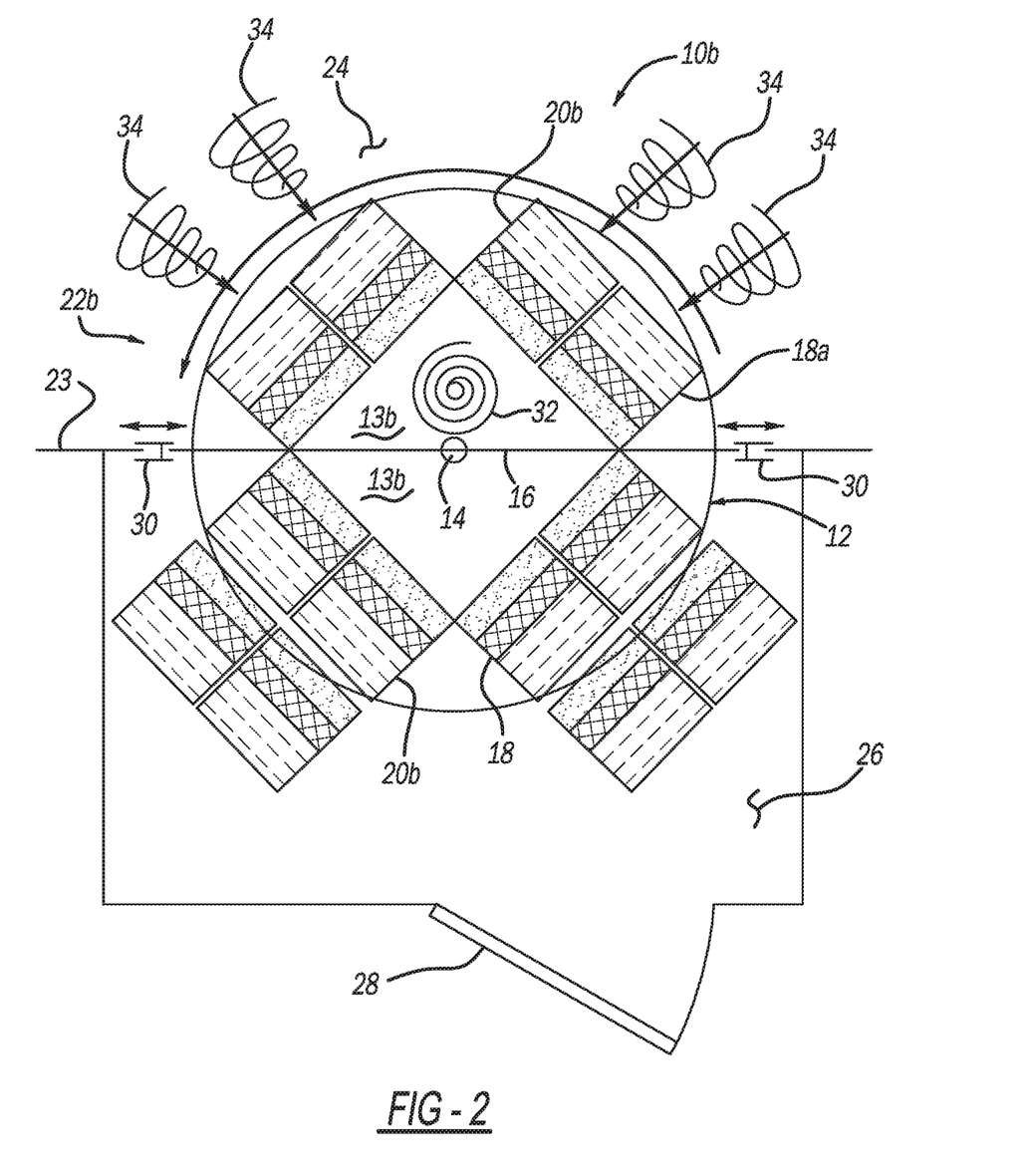
FIG. 2 is a top schematic view of a second embodiment of the present invention.
Figure 3:
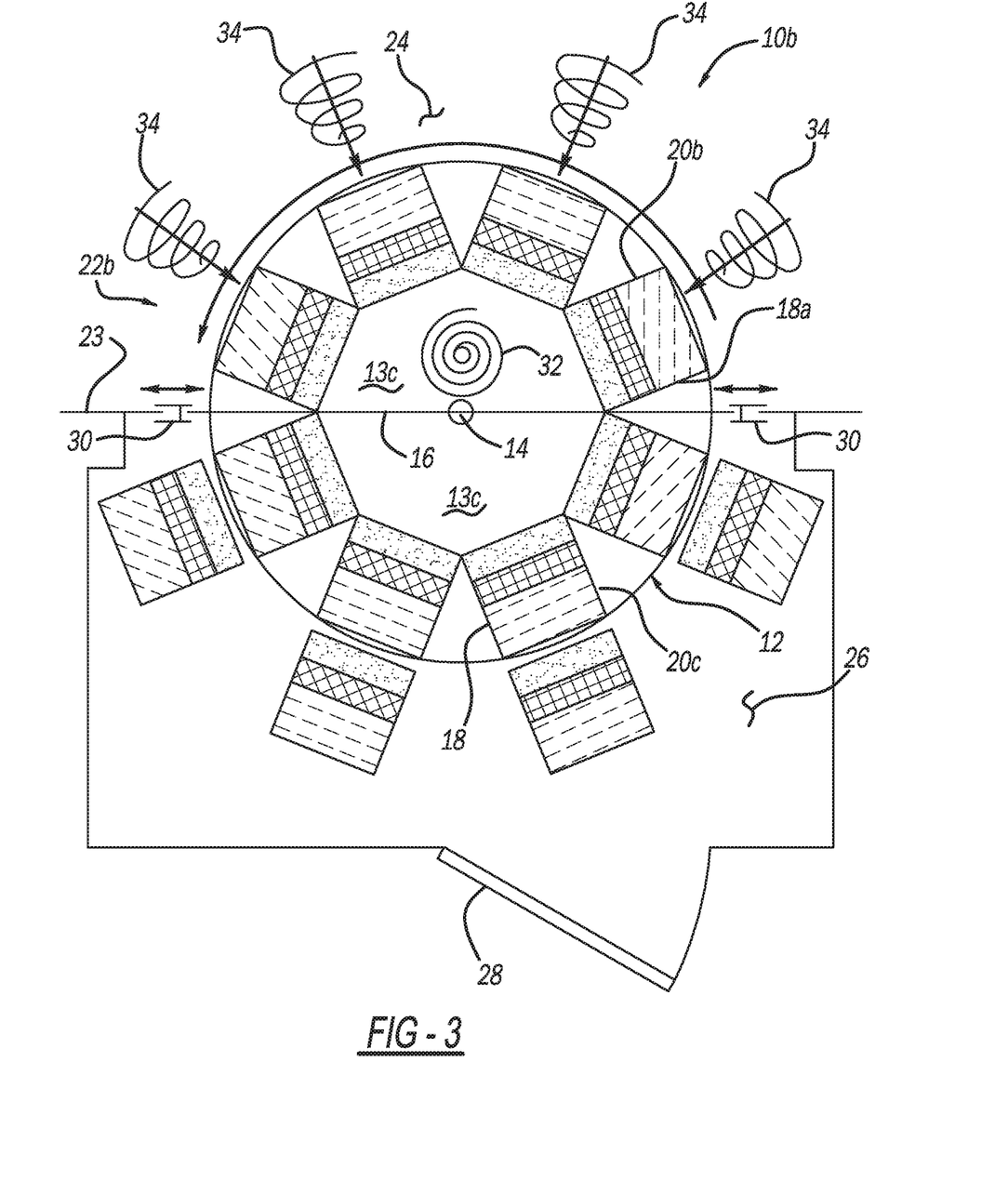
FIG. 3 is a top schematic view of a third embodiment of the present invention.

The carousel modules can have several configurations depending on the airflow requirements of the booth and the type of filters used. We present top views of four exemplary configurations in FIGS. 1, 2, 3 and 6. Module 10a described previously and module 10d shown in FIG. 6 provide three filters 20a and 20d (or three filters stacks) which may be used in any given time, whereas the arrangement of the filters 20b and 20c in modules 10b and 10c, shown in FIGS. 2 and 3 respectively, allows exposure, of for example, four filters at once. Of course, the number of filters per layer, stack or arrangement depends also on the dimensions of the filters used with respect to the limiting inside diameter of carousel 12. A typical carousel 10a-d may have one or more layers, rows or stacks of filters depending on the airflow requirements of the booth, the configuration of carousel 12 and the type and dimensions of filters 20a-d used, as well as the application specifications. As shown by the Figures, additional filters 20a-d are present in the containment chamber 26 which are staged to replace dirty filters, as explained below regarding the operation of the devices.

Figure 4A:
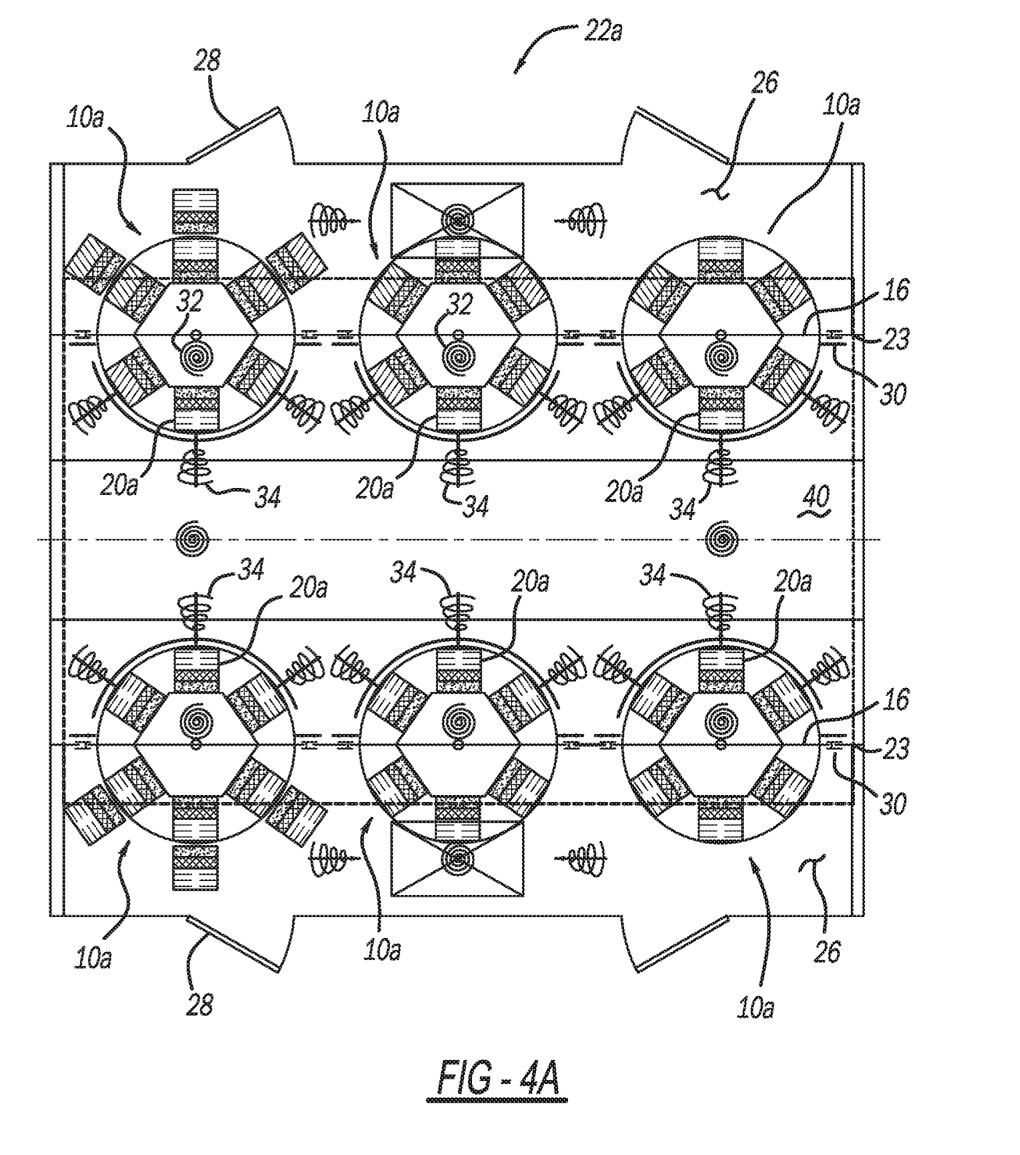
Figure 4B:
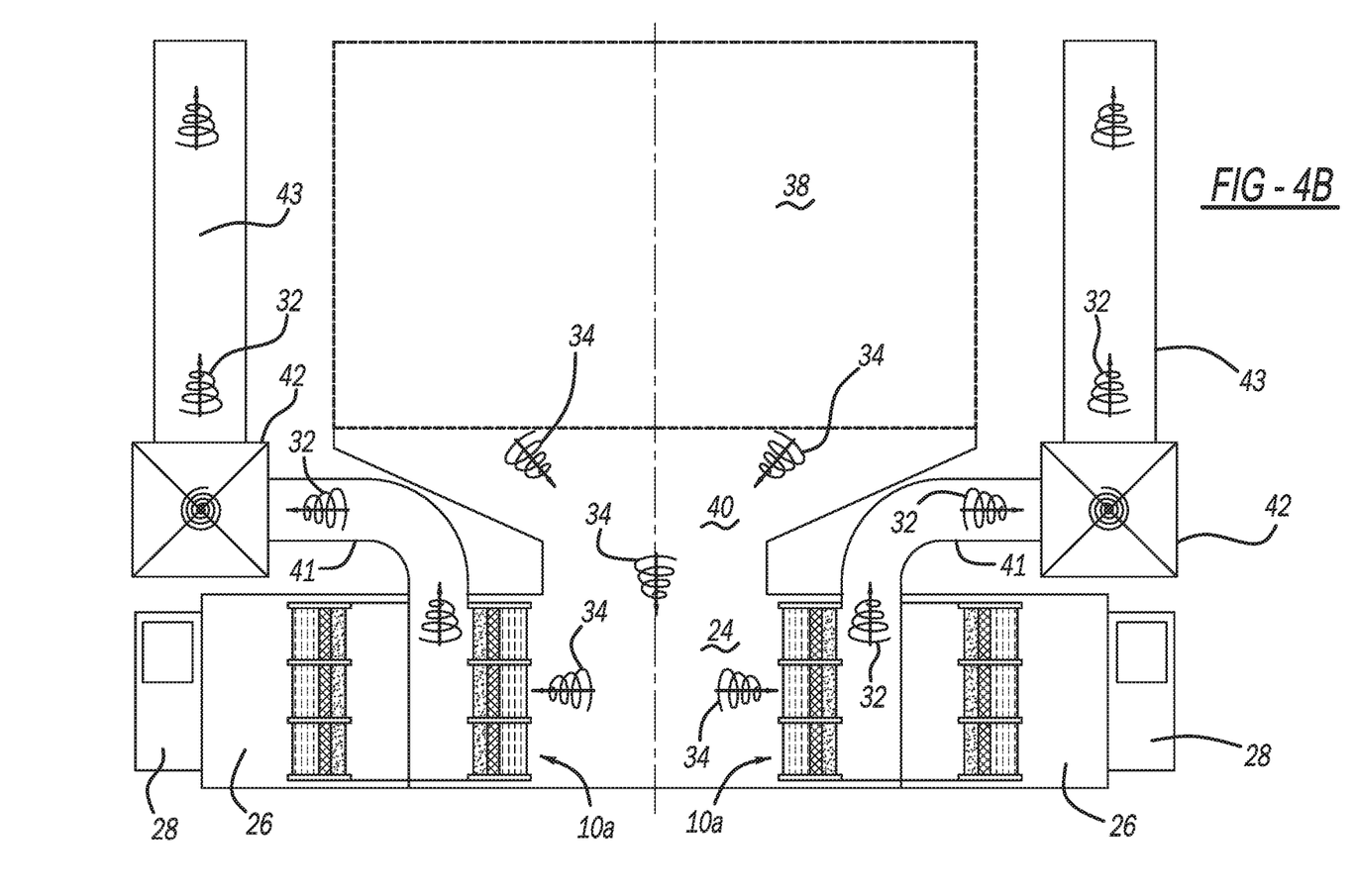

The operation of embodiments of modules 10a-d illustrated in FIGS. 1 to 6 are shown in FIGS. 4(*a-b*) and 5(*a-b*) which present two exemplary applications (or implementations) of module 10a in a spray booth 22a. Applications with other modules configurations may be used.

Referring particularly to FIGS. 4(*a*) and 4(*b*), filter modules 10a are shown in an array of six units arranged with three aligned on opposite sides of the centerline dividing wall 16 of an exemplary spray booth. Spray booth 22a has an upper section 38 and an under section 40. Air drawn through exhaust tap duct 41, exhaust plenum 42 and exhaust duct 43 causes airflow in the direction from upper section 38 to under section 40 through filters 20a, and exits through the exhaust duct. As shown in FIG. 4(*a*), containment chamber 26 provides access a number of dry filter modules 10a.

Figure 5A:
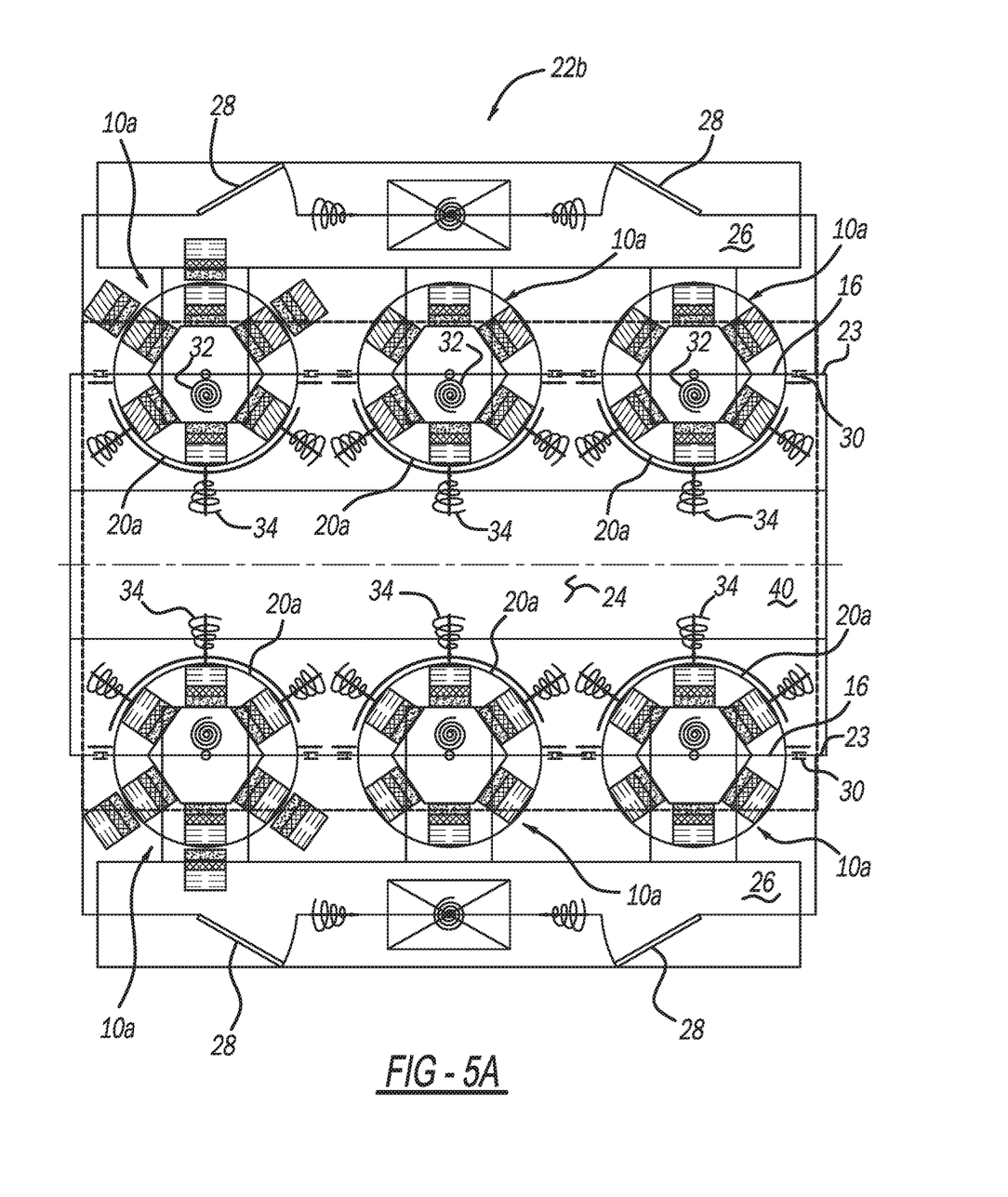
Figure 5B:
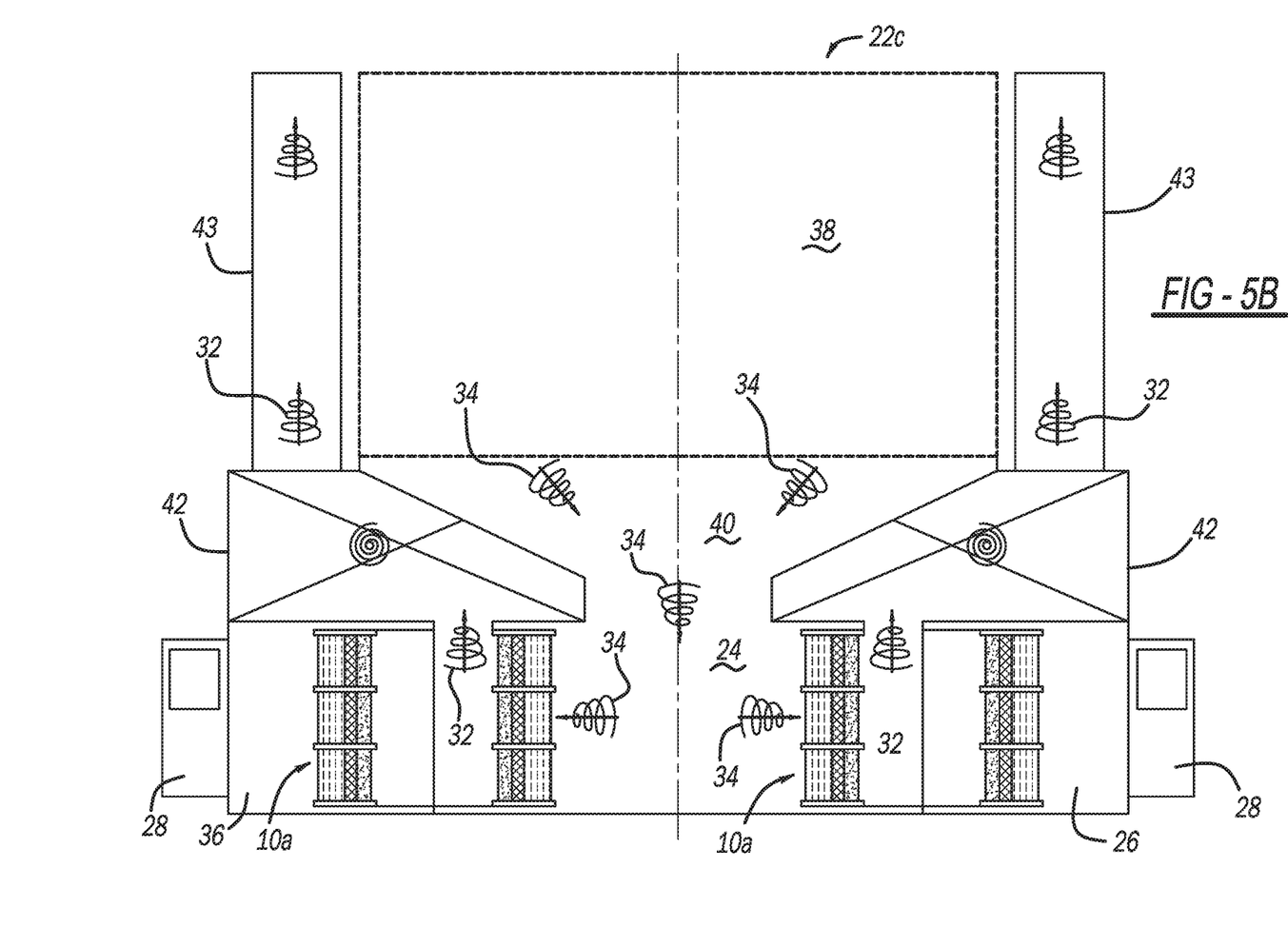

A modified design of spray booth 22b is shown by FIGS. 5(*a*) and 5(*b*). The main difference between the designs shown in FIGS. 4(*a-b*) and FIGS. 5(*a-b*) is the exhaust plenum 42 configuration. In this configuration, exhaust plenum 42 directly connects with the interior chamber of carousels 12, providing the exhaust airflow 32; separate tap ducts are not used in this design.

Notice also that in these applications, three layers of filters 20a per carousel 12 have been used. However, there are no restrictions on the number of layers per carousel 12 used other that those imposed by the airflow/paint loading requirements of the booth and the type and dimension of filters used with respect to the carousel diameter and height.

With particular reference to FIG. 1 and FIGS. 4(*a-b*), the operation of spray booth 22a is described utilizing filters 20a. Operation of units with other examples of filters such as 20b, 20c and 20d is very similar. Air contaminated with paint is drawn into the under section 40 and subsequently toward the dry filter module 10a. The paint laden airflow is forced to pass through the filters 20a assembled in the carousel 12 and into cavity 13a, depositing the paint overspray on the surfaces of the filters. Filters 20a themselves may be of uniform type or composite type (the illustration presents composite type filters). A composite type filter 20a has several layers. The first layer is designed to capture larger paint particles (carrying the most mass), the subsequent layers are designed to capture finer and finer particles (carrying less and less mass). After passing through the filters 20a, the exiting air should be substantially cleaned of paint particles. This airflow is then directed from cavity 13a towards an exhaust plenum 42 in which the cleaner air is collected and directed toward the exhaust fan and, eventually, either to the atmosphere or recirculated back to the booth. If desired or required, the air exiting the modules can be directed to additional filters or other post treatment to remove any remaining particle in the air, or to VOCs and/or odor abating/removing equipment before recirculating the air back to the booth or releasing it to the environment.

When the exposed filters 20a inside the under section 40 have been sufficiently loaded with paint, the retractable clamp seals 30 can be released and the carousel 12 is allowed to rotate 180 degrees (or to flip) to expose clean filters previously loaded into the carousel from within the containment chamber 26. Once the carousel 12 has been flipped, the clamp seals 30 can be engaged again to secure the carousel in the appropriate operating position. The flipping operation may be carried out with minimal downtime.

Next, the dirty filters 20*a* can be now removed from within the accessible containment chamber 26 and replaced with clean ones in preparation for the next flipping operation. Dirty filters 20*a* may be taken by the operator to a filter disposal location. The drawing figures show replacement filters 20*a-d* positioned inside containment chamber 26 to be used as replacements for dirty filters.

Figure 6:
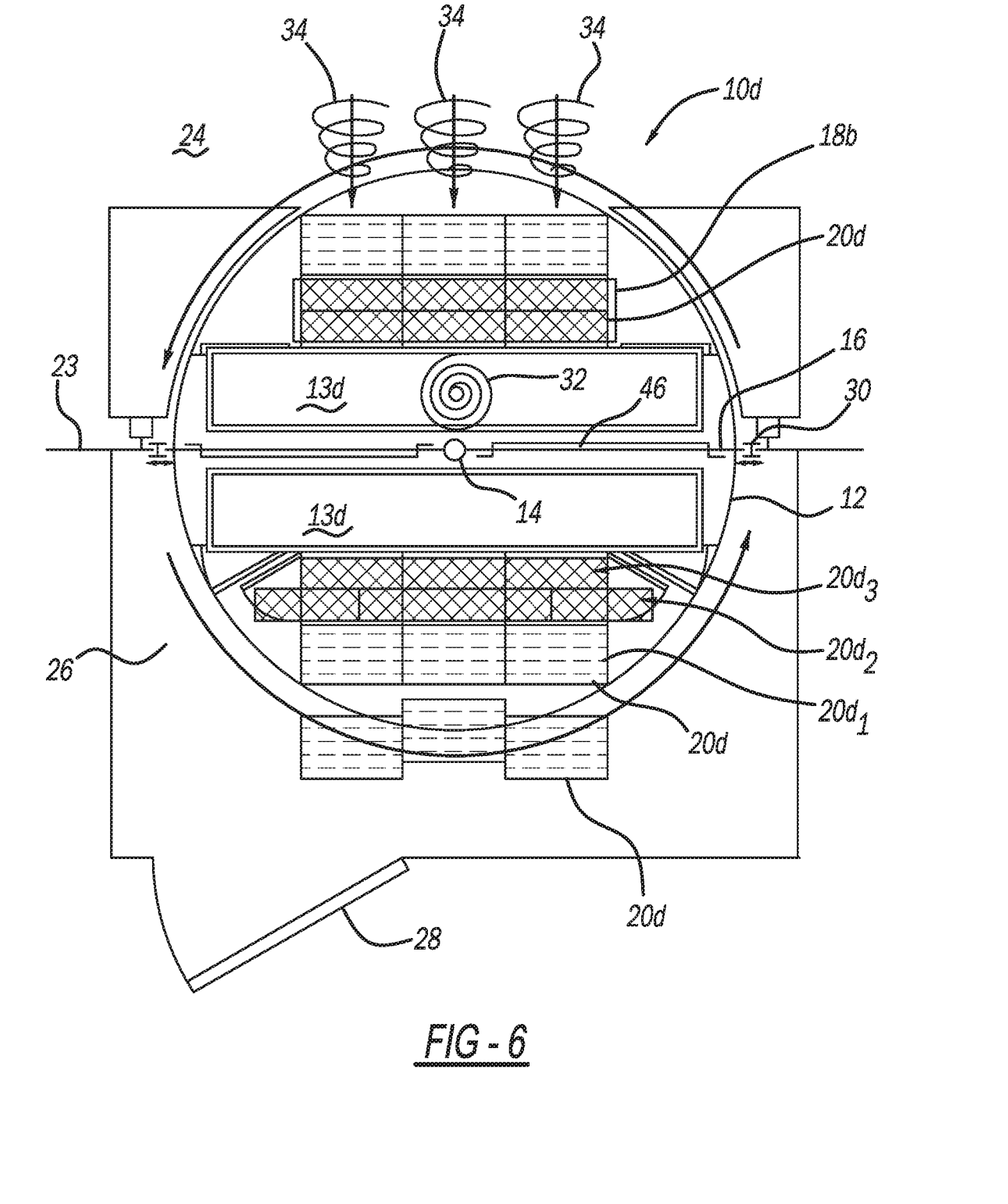
FIG. 6 is a top view of a dry filter module in accordance with an alternate embodiment of the invention.
Figure 7:
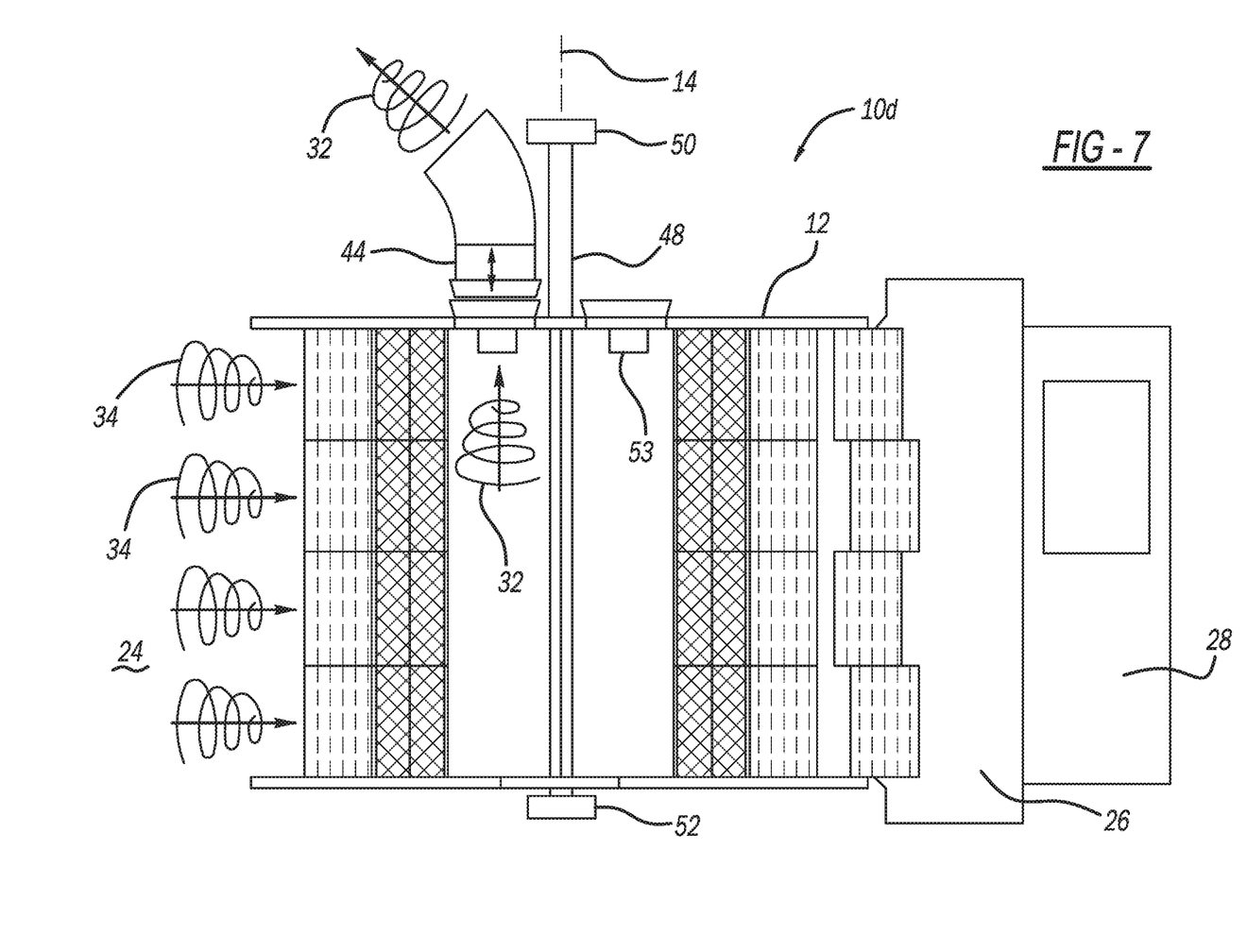
FIG. 7 is a side view of the dry filter module shown in FIG. 6.

Drawing FIGS. 6-11 illustrate further alternate embodiments of dry filter modules in accordance with the present invention. FIGS. 6 and 7 illustrate dry filter module 10*d* which incorporates a number of design features differing from the previous embodiments. In this embodiment, the position and orientations of the filter elements 20*d* has changed. These filters now directly face the centerline of the under section 40 of the associated spray booth rather than facing radially outwardly. Accordingly the cavities 13*d* behind filter elements 20*d* are rectangular shaped in plan view. Referring specifically to FIG. 6, filters 20*d* are shown aligned with dividing wall 16. This embodiment further differs in that filters 20*d* are provided as modular units with individually replaceable first, second and third stages 20*d*1, 20*d*2 and 20*d*3, respectively. By separating the filters in this manner, replacement of sections can be conducted as required by paint loading of that section rather than an entire composite unit. For example, it is acknowledged that frequently a first stage such as 20*d*1 would tend to load up more quickly than subsequent filter stages.

This embodiment further differs in the manner with which the filters 20*d* are changed. The primary filters 20*d*1 are removed from the front of the unit as in the prior embodiments while the secondary and tertiary filters 20*d*2 and 20*d*3 are removed from the sides of the module (behind the primary filters). Another difference from the prior embodiments is best shown with reference to FIG. 7. As illustrated, an engageable and articulating duct seal 44 is provided. This allows a good seal to be present when the unit is in operation but is retracted to disengage from carousel 12, allowing the carousel to be rotated as described previously. The duct seal 44 engages with a port on both sides of dividing wall 16. A one-way flapper type check valve 53 can be used to help ensure that airflow only occurs in the direction into carousel 12. Since under section 40 operates at a negative gauge pressure leakage of air will tend to occur into containment chamber 26.

FIG. 6 further illustrates another design revision associated with dry filter module 10*d*. As shown, dividing wall 16 includes a number of removable panels 46. These panels 46 allow for an increase in the space available in case work needs to be performed inside the module, for example accessing rotation shaft 48 or its upper and lower bearings 50 and 52.

Further shown in FIG. 6 is the presence of covers 54 which protect the sides of the module that do not have filter inlets exposed to the paint in the spray booth 22. This feature helps to direct and distribute the airflow toward the filters while avoiding unnecessary recirculation of the flow in under section 40. Moreover, the covers 54 protect the area while access to the secondary and tertiary filters are located. Since the under section 40 of the spray booth in operation is that a negative gauge pressure any air drawn through any gaps will be in the direction of the under section avoiding leaks to the outside of the booth.

Figure 8:
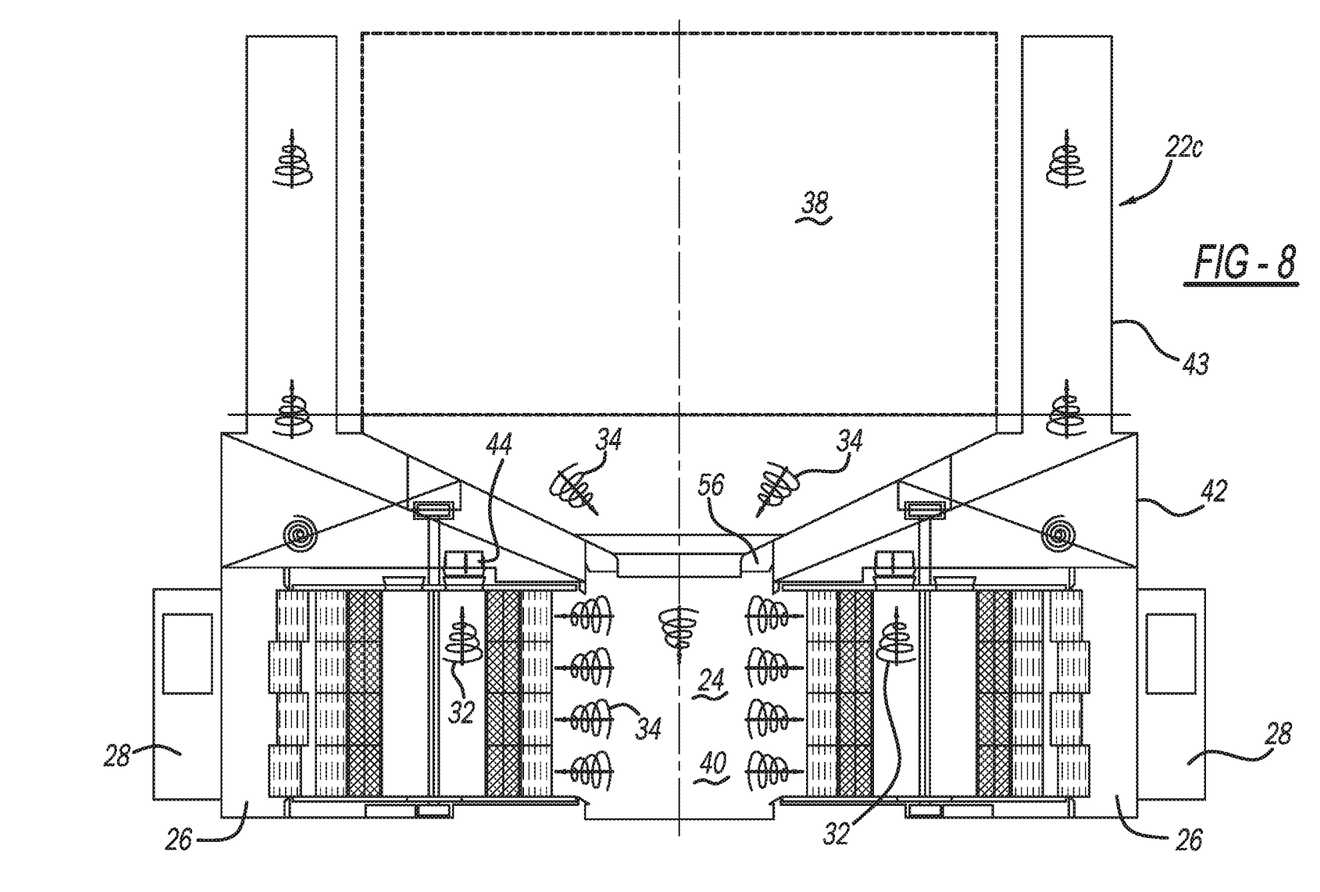
FIG. 8 is a side view of a spray booth incorporating a plurality of the dry filter modules shown in FIGS. 6 and 7 providing a relatively high airflow capacity.
Figure 9:
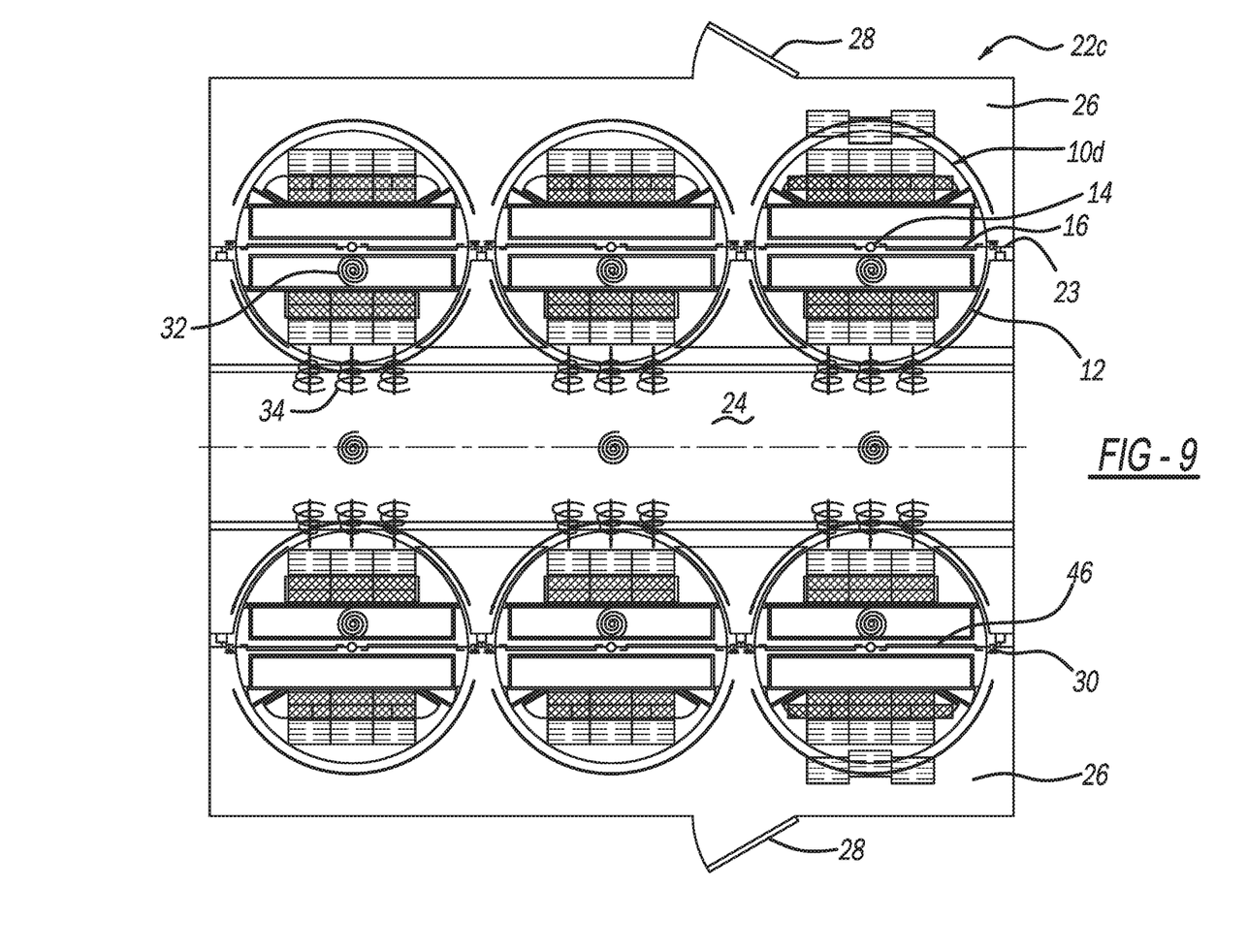
FIG. 9 is a top view of the spray booth shown in FIG. 8.

FIGS. 8 and 9 illustrate spray booth 22*c* which provides a comparative high airflow capacity in that it incorporates two rows of carousels 12 with filter elements 20*d* as described previously. This figure also illustrates the presence of nozzle insert 56. Nozzle insert 56 is provided to stabilize pressure drop through the booth and may further perhaps permit filter changes while the associated booth is operating without causing too great of a disturbance in the upper section 38 of the booth. The insert 56 would be configured to provide a desired pressure drop, given the airflow through the unit. Its precise dimensions would depend on the airflow rate at which the spray booth is operating, the types of filters used, and the maximum pressure drop allowed through the filters. Insert 56 can also help direct airflow in the direction along the booth toward the filters 20*d* in the carousel below.

Figure 10:
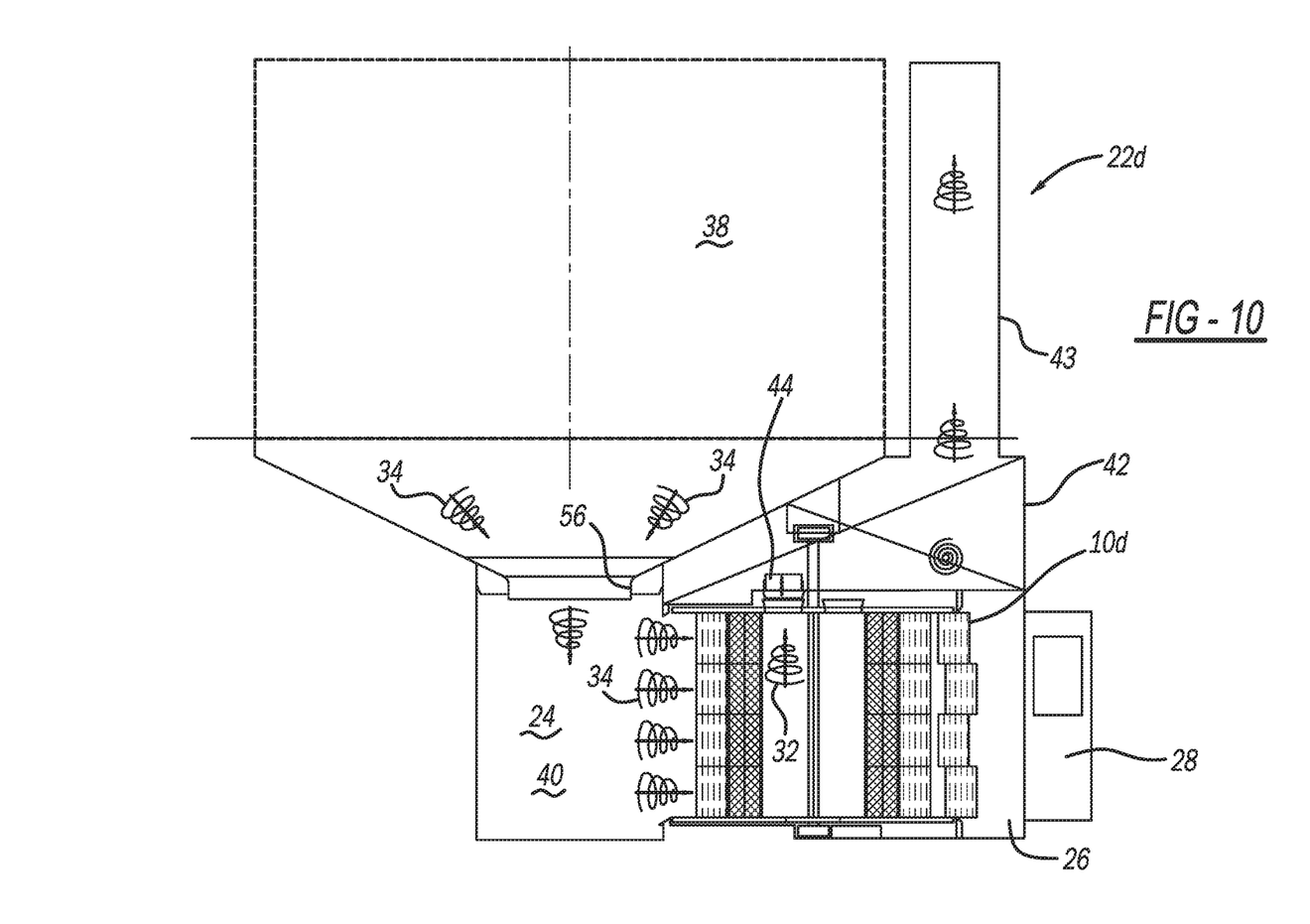
FIG. 10 is a top view of a dry filter module in accordance with another alternate embodiment of the invention providing a relatively lower airflow capacity (as compared to assembly shown in FIGS. 7-9).
Figure 11:
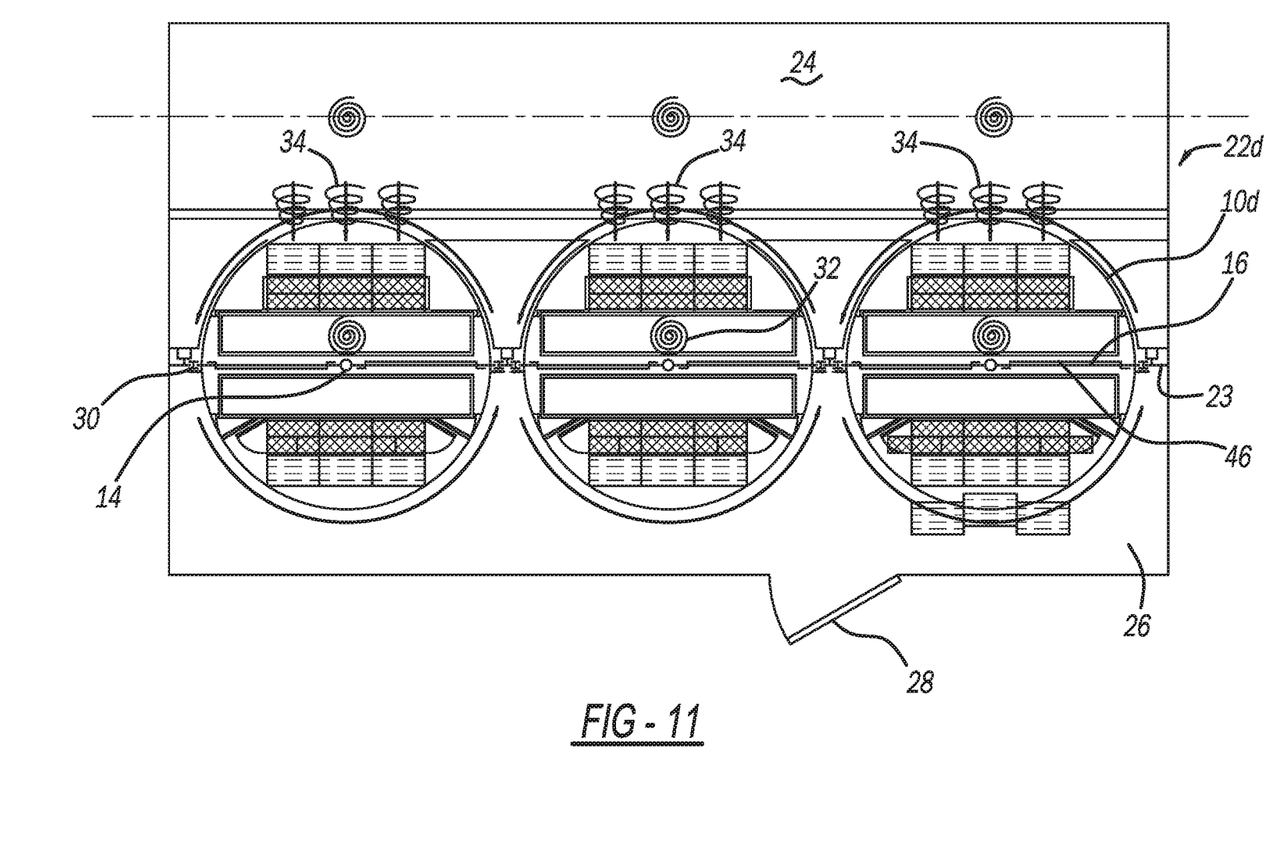
FIG. 11 is a top view of the spray booth shown in FIG. 8.

FIGS. 10 and 11 illustrate a configuration of spray booth 22*d* having a comparatively low flow capacity (as compared with spray booth 22*c*). In this case a single row of carousels 12 and filter modules is provided. Of course the capacity requirements of the system will dictate which type of configuration will most optimally meet the application requirements.

While the above description constitutes the preferred embodiment of the present invention, it will be appreciated that the invention is susceptible to modification, variation and change without departing from the proper scope and fair meaning of the accompanying claims.

The invention claimed is:

1. A spray booth with a dry filter module comprising;
   a housing forming an interior compartment of the spray booth,
   a containment chamber joining an outer surface of the housing,
   an exhaust plenum or duct for conducting an airflow into, through and out of the interior compartment of the spray booth,
   the dry filter module comprising,
   a rotatable carousel holding one or more filters,
   a diametric partition wall within the carousel defining a first side and a second side and respectively separating a first and a second array of the filters,
   the carousel having a first cavity on the first side of the diametric partition wall and a second cavity on the second side of the diametric partition wall, the first and second interior cavities capable of communicating with the airflow,
   the carousel placed between the housing interior compartment and the containment chamber,
   the carousel movable between a first position and a second position, in the first position, the first array of filters is exposed to the interior compartment of the spray booth and the airflow flows through the first array of filters and into the first hollow interior cavity with the second array of filters positioned in the containment chamber, and the carousel being rotatable to the second position wherein the second array of filters is exposed to the interior compartment of the spray booth and the airflow flows through the second array of filters and into the second hollow interior cavity with the first array of filters positioned in the containment chamber.

2. The spray booth in accordance with claim 1 further comprising, the carousel has a circular plan form shape with the diametric partition wall forming a plane passing through a center of rotation of the carousel.

3. The spray booth in accordance with claim 2 further comprising, a shaft for providing rotation of the carousel about an upper and a lower bearing.

4. The spray booth in accordance with claim 1 further comprising, a clamp seal which is actuated to seal between a partition wall of the spray booth housing and the diametric partition wall when the carousel is in either the first or the second position, and being releasable from engagement when the carousel is moved between the first or the second positions.

5. The spray booth in accordance with claim 1 wherein the first and the second filter arrays are comprised of unitary filter elements.

6. The spray booth in accordance with claim 1 wherein the first and second filter arrays are comprised of modular filter elements having at least a first stage and a second stage which can be replaced separately.

7. The spray booth in accordance with claim 1 further comprising, the containment chamber includes an exterior door which can be closed to create an enclosed environment for access to one of the first or the second filter arrays.

8. The spray booth in accordance with claim 1 further comprising, the spray both having a duct seal which can be actuated to engage between the first and the second hollow interior cavities and a duct for the airflow, the duct seal being actuatable to release from disengagement with the first and the second hollow interior cavities when the carousel is being moved between the first and the second positions.

9. The spray booth in accordance with claim 1 further comprising, a nozzle within the spray booth for providing a predetermined pressure drop in the airflow within the spray booth interior compartment.

10. The spray booth in accordance with claim 1 further comprising, the spray booth forms an upper section were a spraying operation may be conducted with the airflow moving between the upper section into an under section where the dry filter modules are positioned.

11. The spray booth in accordance with claim 1 further comprising, the spray booth forming an upper and a lower section with a plurality of the dry filter modules positioned within the lower section.

12. The spray booth in accordance with claim 11 further comprising, the plurality of dry filter modules positioned on one side of a vertical plane centerline of the spray booth.

13. The spray booth in accordance with claim 11 further comprising, the plurality of dry filter modules positioned on two sides of a vertical plane centerline of the spray booth.

* * * * *